Oct. 2, 1928.
J. S. THOMPSON
1,686,191
FRICTION BLOCK
Filed April 13, 1927
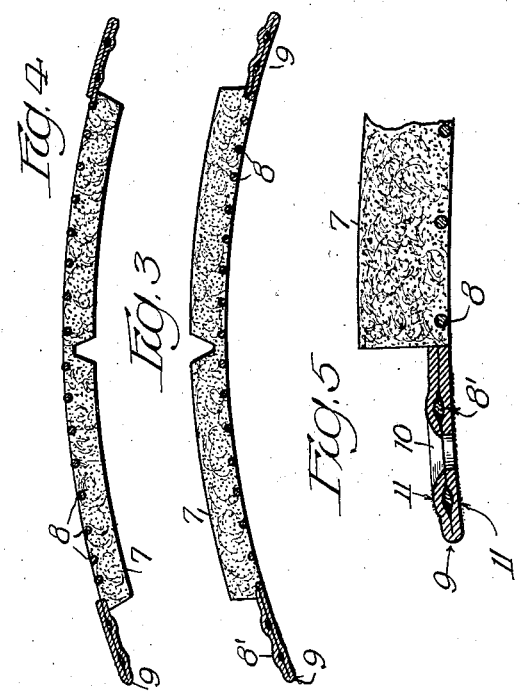
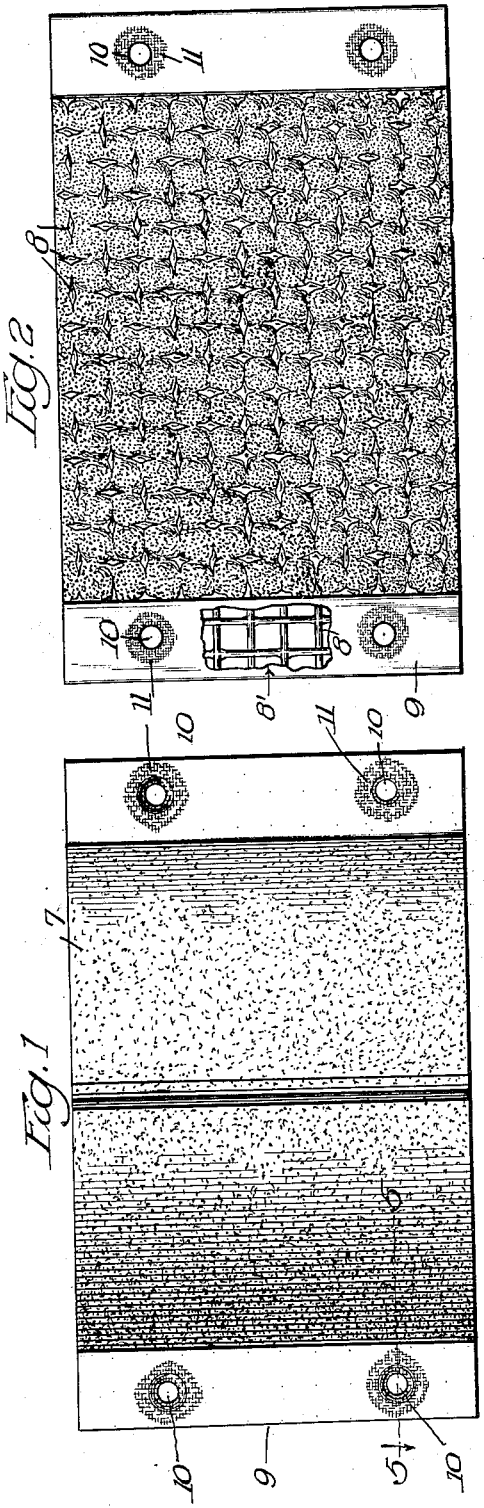
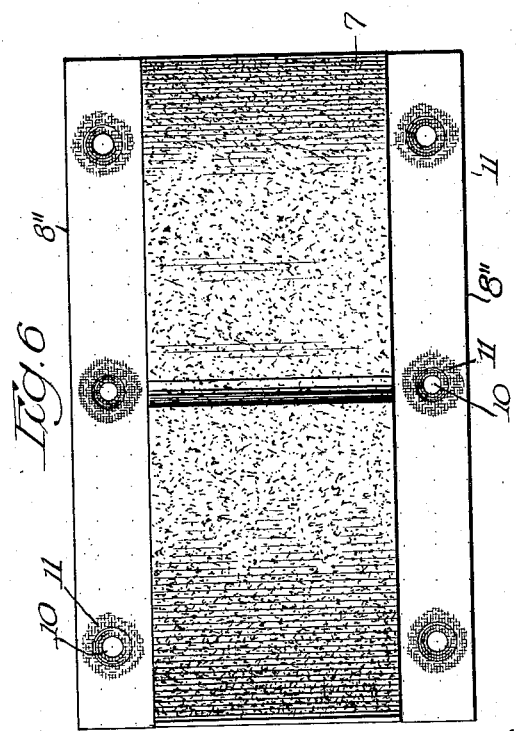
Inventor
James S. Thompson
By Wm. O. Bell Atty.

Patented Oct. 2, 1928

1,686,191

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BLOCK.

Application filed April 13, 1927. Serial No. 183,384.

This invention relates generally to friction brakes and more particularly to the provision of a novel block or shoe for braking a moving member by frictional contact therewith.

The object of the invention is to provide a novel and efficient brake block which can be made in a form and a size adapted for any brake assembly and provided with means whereby it may be easily and quickly secured in rigid position therein.

Another object of the invention is to provide a friction block with novel means of strong and substantial character whereby it may be secured in rigid position in a friction brake assembly.

There are many different kinds of brake assemblies in which a block or shoe of this type may be employed, but for the purposes of this application, I have shown the invention embodied in forms adapted for internal expanding and external contracting brakes for automotive vehicles.

Referring to the drawings:

Fig. 1 is a front view and Fig. 2 is a back view of a brake block embodying the invention.

Fig. 3 illustrates a type of block for an internal expanding brake.

Fig. 4 illustrates a type of block for an external contracting brake.

Fig. 5 is a detail enlarged sectional view on the line 5—5 of Fig. 1.

Fig. 6 illustrates a block in which the projecting parts of the back are at the sides of the block.

Referring to the drawings the block comprises a body 7 mounted upon and anchored to a reticulated back 8 which may be made of wire mesh, expanded metal or some other form of reticulated metal. The body is made of a suitable composition which will provide friction sufficient for the intended purpose and which is wear and heat resistant. I do not claim the composition in this application because the invention herein claimed is not restricted to the use of a particular composition, but is capable of use with a body formed of any composition suitable for the intended purpose.

The back is embedded in the body and is rigidly united therewith. Parts of the back project beyond the body of the block to receive the means whereby the block is secured in place on its support. In Figs. 1-4 these projecting parts 8' are at the ends of the block; in Fig. 6 the projecting parts 8'' are at the sides of the block. Each projecting part has a metal reinforcement on both sides thereof and this reinforcement is preferably provided by a metal strip 9 doubled on the projecting part of the back so that the doubled strip encloses both sides and the end edge of the projecting part. One or more openings 10 are punched through the doubled metal strip and the enclosed projecting part of the back to receive suitable means whereby the block is fastened in place to its support in a brake assembly. The two sides of the metal strip are then spot welded at 11 to each other and to the enclosed part of the back at the edge of each opening so that the doubled strip is rigidly secured to the back and reinforces the projecting part of the back to provide a strong and substantial anchorage for the fastening means. The reinforcing strip may be spot welded at other places than about the openings 10, but I prefer to spot weld about each opening because this strengthens the wall of the opening and provides a strong anchorage for the fastening means in the back of the block.

The invention may be embodied in brake blocks for friction brakes of different kinds. In Fig. 3 I have shown it adapted for an internal expanding brake and in Fig. 4 for an external contracting brake for an automotive vehicle. The construction and arrangement of parts may be changed as required to adapt it for other installations and I reserve the right to make all such changes as fall within the following claims:

I claim:

1. A friction block comprising a back and a composition body mounted thereon, a part of the back projecting beyond the body, and a metal reinforcing strip on said projecting part, said strip being spot welded to the projecting part of the back.

2. A friction block comprising a back and a composition body mounted thereon, a part of the back projecting beyond the body, and a metal reinforce on both sides of said projecting part and spot welded thereto.

3. A friction block comprising a back and a composition body mounted thereon, a part of the back projecting beyond the body, and a metal reinforcing strip doubled on said projecting part and spot welded thereto.

4. A friction block comprising a back and a composition body mounted thereon, a part of the back projecting beyond the body, and a metal reinforce having an opening therein and spot welded to the back at the edge of said opening.

5. A friction block comprising a back and a composition body mounted thereon, a part of the back projecting beyond the body, and a metal reinforce on both sides of said back and having an opening therethrough and spot welded at the edge of said opening.

6. A friction block comprising a back and a composition body mounted thereon, a part of the back projecting beyond the body, and a metal strip doubled on said projecting part and having an opening therethrough and spot welded at the edge of said opening.

7. A friction block comprising a back and a composition body mounted thereon, a part of the back projecting beyond the body, and a metal reinforce on both sides of said projecting part and having an opening extending through the reinforce and the projecting part and spot welded around said opening.

JAMES S. THOMPSON.